(12) United States Patent
Long et al.

(10) Patent No.: US 10,352,824 B2
(45) Date of Patent: Jul. 16, 2019

(54) METHOD FOR EVALUATING TURBINE ENGINE SYSTEM STABILITY

(71) Applicant: Aero Systems Engineering, Inc., St. Paul, MN (US)

(72) Inventors: Dean Frederick Long, Lester Prairie, MN (US); Kenneth William Simon, Woodbury, MN (US); Grant August Radinzel, Houlton, WI (US)

(73) Assignee: Aero Systems Engineering, Inc., St. Paul, MN (US)

( * ) Notice: Subject to any disclaimer, the term of this patent is extended or adjusted under 35 U.S.C. 154(b) by 996 days.

(21) Appl. No.: 14/538,996

(22) Filed: Nov. 12, 2014

(65) Prior Publication Data

US 2015/0134270 A1  May 14, 2015

Related U.S. Application Data

(60) Provisional application No. 61/902,968, filed on Nov. 12, 2013.

(51) Int. Cl.
  *G01M 15/14* (2006.01)
(52) U.S. Cl.
  CPC .................. *G01M 15/14* (2013.01)
(58) Field of Classification Search
  CPC .................................................... G01M 15/14
  See application file for complete search history.

(56) References Cited

U.S. PATENT DOCUMENTS

| | | | |
|---|---|---|---|
| 5,837,890 A | 11/1998 | Long | |
| 6,725,912 B1 | 4/2004 | Moll et al. | |
| 6,748,800 B2 | 6/2004 | Lacey, Jr. | |
| 8,863,895 B2 | 10/2014 | Cheng et al. | |
| 2013/0046507 A1* | 2/2013 | Vega Paez | F01D 21/00 702/179 |

OTHER PUBLICATIONS

First Office Action for Canadian Patent Application No. 2,870,512, dated Sep. 26, 2016 (3 pages).
"Sweep Test Techniques to Reduce Cost of Turbine Engine Altitude Testing," AIAA Aviation Forum, Jun. 2018, pp. 1-9.

* cited by examiner

*Primary Examiner* — Leslie J Evanisko
(74) *Attorney, Agent, or Firm* — Dorsey & Whitney LLP

(57) ABSTRACT

Systems and methods for determining turbine engine system stability encompass measuring or otherwise determining values of performance parameters, storing a data set of such values in memory, generating a stability indicator, and displaying the stability indicator on an operator interface. The stability indicator is generated by a processor operating in data communication with the computer memory, utilizing customized software algorithms to remove high frequency components, apply an adaptive filter to adjust selected parameters according to a target value of a selected target parameter, and apply a stochastic filters to estimate true values of the selected parameters, based on the remaining variation.

17 Claims, 8 Drawing Sheets

METHOD FOR EVALUATING TURBINE ENGINE SYSTEM STABILITY

CROSS-REFERENCE TO RELATED APPLICATIONS

This application claims priority to U.S. Provisional Application No. 61/902,968, SYSTEM AND METHOD FOR IMPROVING ACCURACY, filed Nov. 12, 2013, which is incorporated by reference herein, in the entirety and for all purposes.

BACKGROUND

The present disclosure relates generally to performance evaluation, including the evaluation of turbine engine performance. More particularly, the disclosure relates to systems and methods for evaluating the performance of turbine engine systems and subsystems, including, but not limited to, turbofan, turboshaft, and turboprop engines, and industrial gas turbine engines.

More generally, this disclosure also relates to performance evaluation for testing systems, including test cells and other testing configurations for turbine engine systems. Suitable applications include, but are not limited to, the test configurations described in U.S. Pat. Nos. 5,837,890, 6,725,912, 6,748,800, and 8,863,895, each of which is incorporated by reference herein, in the entirety and for all purposes.

These approaches include standard practices that have produced acceptable results for decades. The procedures have been incrementally improved as engine manufacturers and customers (e.g., airlines and power companies) require more precise answers to meet competitive demands. Better transducers, control of the test environment, increased measurement accuracy, and many other factors have now been improved to the point where additional gains become increasingly difficult, and incremental improvement of the individual elements may be unlikely to produce substantial results. As the industry continues to strive for further increases in accuracy, therefor, a new paradigm for and approach to the measurement process may be required.

SUMMARY

This application is directed to determining turbine system stability utilizing a computer system or stability processor. The turbine system may include a turbine engine, for example a turbofan engine, a turboshaft engine, a turboprop engine, an industrial gas turbine, or a subsystem thereof.

Values of performance parameters are measured or otherwise determined for the turbine engine system. The performance parameters include both independent parameters and dependent parameters, forming a data set collected over a selected data acquisition time or period. A computer processor is utilized to process the data, for example by removing high frequency components from the measured values of the performance parameters. An adaptive filter can also be applied to adjust the measured values of the dependent parameters to a target value of a selected independent parameter, where the adaptive filter is corrected based on prior measured values of the performance parameters.

A stochastic filter may be used to reduce noise in each of the measured values, so that true values of the dependent parameters can be estimated, based on the remaining variation in the measured values. This allows a stability indicator to be generated for the turbine engine system, based on changes or variation in the estimated true values of the dependent parameters. The stability indicator is output to a user interface or control processor, for example to be displayed on an operator interface for operation or testing of the turbine engine system, or for use in validating test data sets.

DETAILED DESCRIPTION

This disclosure describes a multi-step procedure and/or system intended to improve on a simple averaging filter approach to engine testing and measurement. Each step of the procedure involves an algorithm designed to obtain a specific objective, as described herein. The techniques described here also include an application sequence which tunes the signal of a selected characteristic of a turbine engine, as measured or determined by a data acquisition and processing system. These methods contemplate a premise that true engine control processes may be inherently unsteady. Slight fluctuations in different parameters which are created by the engine control system attempting to correct to a target value (such as fuel flow for example), may produce corresponding and/or correlated fluctuations in other parameters, such as spool speeds (e.g., in RPM), thrust, and engine pressure ratio (EPR).

In various examples and embodiments, the first step is to remove high frequency components that are not part of the engine process. These include, e.g., resonances of the thrust frame and the oscillations of the fuel flow, both of which can have significant amplitude and mask true underlying engine processes. Eliminating these components is performed using a low pass filter, e.g., with a preset engine dependent cutoff frequency.

The second step removes correlated unsteadiness, e.g., using an adaptive filter to adjust dependent parameters such as thrust and fuel flow according to a fixed or target value of the selected independent parameter (e.g., spool speed or engine pressure ratio). The adaptive filter constantly corrects its settings using prior statistics as new data is collected.

The third step is to remove the remaining unsteadiness, e.g., using a stochastic filter to reduce or minimize the uncorrelated noise in each signal. This filter can also adjust its settings using prior statistics as new data is collected. The remaining variation in the filtered and processed signal is an estimate of the true underlying engine process, as described by the processed parameter data.

While mean levels (averages) can be determined for any operational engine parameter, true steady state conditions do not necessarily exist. The unsteadiness in relevant parameter values may be small in an absolute sense, but nonetheless remain important relative to current accuracy requirements. Slight fluctuations in fuel flow, for example, created by the engine control system attempting to correct toward a particular target value, may produce corresponding fluctuations in rotor or spool speeds followed by similar behavior in the thrust level and EPR. Using data acquisition techniques capable of simultaneous sampling and digital signal processing to evaluate the unsteadiness in different engine parameters, an increased understanding of the engine process can be gained, resulting in improved measurement and operational precision.

Figure 1:
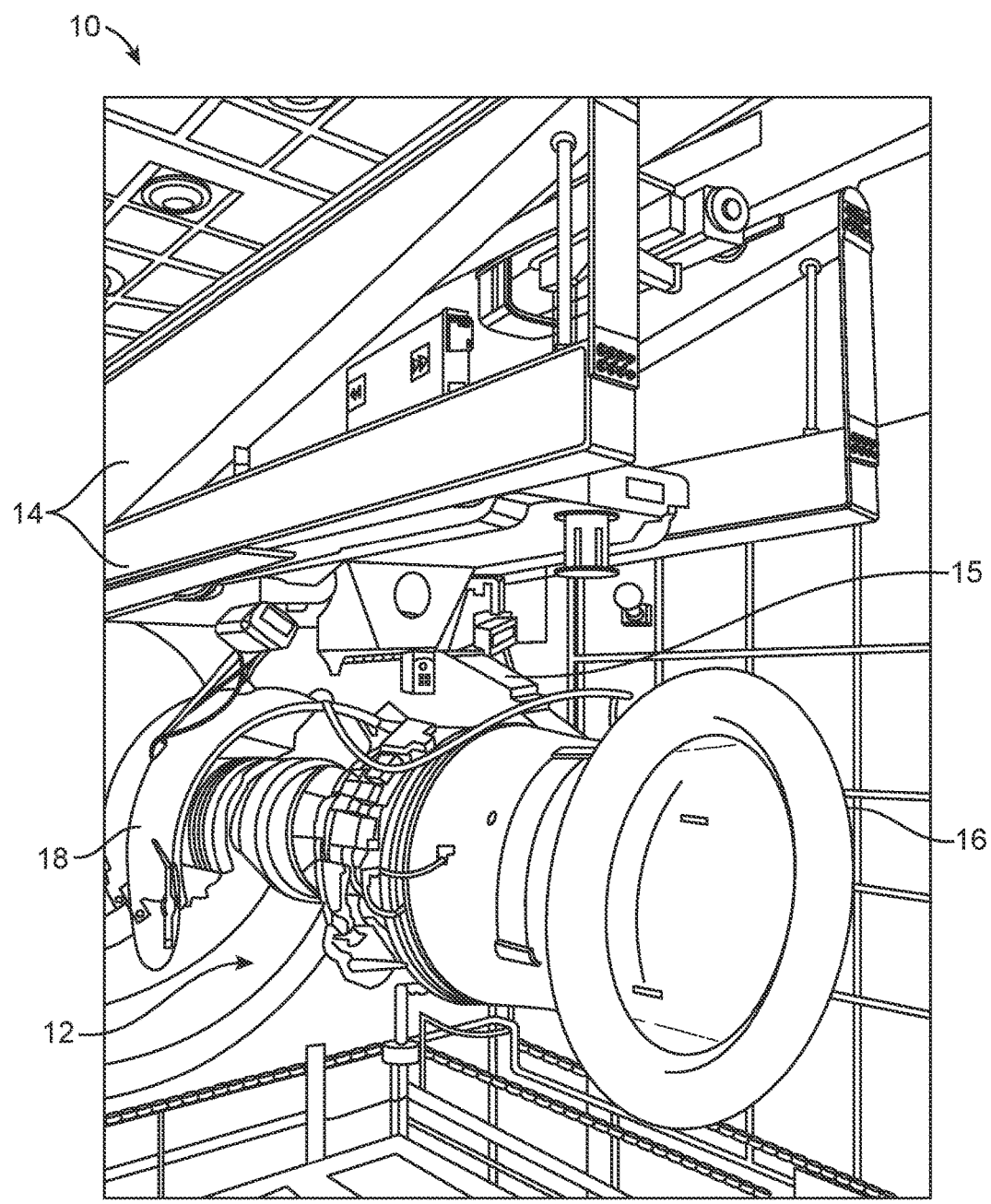
FIG. 1 is an isometric view of a turbine engine within a test cell.

FIG. 1 is a perspective view of a representative test cell 10 for turbine engine system 12. As shown in FIG. 1, turbine engine system 12 is mounted to support structure 14 within test cell 10, via engine mount 15. Inlet bell mouth 16 guides airflow into turbine engine system 12, for example using a bell mouth or similar configuration to measure airflow and reduce losses in the absence of ram air pressure present during flight operations.

Cowling 18 is shown in an open configuration in FIG. 1, showing the internal components of an exemplary turbofan engine system 12 with one or more fan, compressor and turbine stages. Alternatively, turbine engine system 12 may be configured as a turbojet, turboshaft or turboprop engine, or an industrial gas turbine or steam turbine engine. Turbine engine system 12 may also include or be provided as one or more selected turbine engine subsystems.

The performance of a turbofan engine or other turbine system 12 can be evaluated using an outdoor test stand or indoor test cell 10, as shown in FIG. 1. There are three basic types of testing scenarios:

1) Development or experimental tests, as the name implies, can be performed during the design phase of a new engine type.
2) Production tests can be conducted to evaluate newly manufactured engines, e.g., before being put into service for the first time.
3) Maintenance tests are typically conducted after a period of operation, for example after an overhaul process and/or to ensure proper operation before the engine is put back into service.

One basic assumption in many testing cases is that the engine system can be set to a stable condition, with measurements and/or readings of operational parameters taken to document steady state values. Corrections can be applied to adjust the measurements and/or corresponding mean values taken over a particular sampling time, for example using standard day conditions with defined ambient temperature, pressure, and humidity. Additional corrections can be applied to produce a consistent set of results for target values of one or more parameters against which the variation of other parameters is compared or established.

Common target (e.g., independent) parameters may include fan speed and other spool speeds (N1, N2, etc.), and temperature and pressure parameters such as the engine pressure ratio. Common dependent parameters may include thrust and fuel flow (e.g., for turbofan engines) or torque (e.g., for turboshaft engines).

Figure 2:
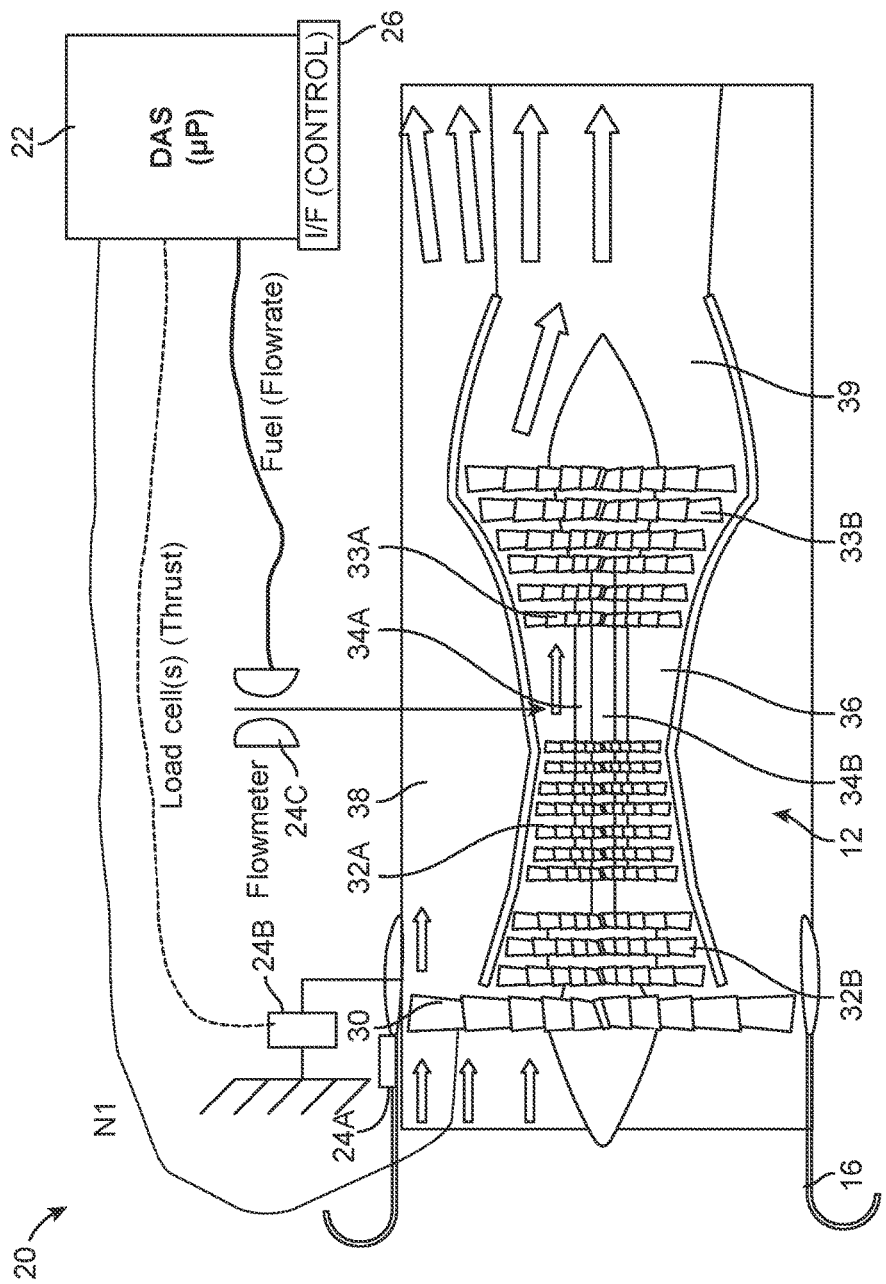
FIG. 2 is a schematic view of a data acquisition and processing system for turbine engine performance evaluation.

FIG. 2 is a schematic view of data acquisition and processing system 20 for turbine engine system performance evaluation, e.g., as applied to turbine engine system 12 of FIG. 1. As shown in FIG. 2, system 20 includes a data acquisition and computer processor/microprocessor system (DAS) 22, with one or more sensors 24A, 24B, 24C, etc., configured to measure various operational parameters of a turbofan or other turbine engine system 12. Data acquisition system 22 can be provided in data communication with an operator interface (I/F) or control system 26, forming a turbine engine system stability assessment computer (or processor system).

In this particular example, turbofan engine system 12 includes a fan stage 30 with high and low pressure compressor sections 32A and 32B, which are coupled to corresponding turbine sections 33A, 33B via one or more shafts 34A, 34B to form independently rotating spools (e.g., high and low or fan spools, and/or an intermediate pressure spool). Fuel is mixed with compressed air in combustor section 36, generating hot combustion gases to drive turbines 33A, 33B, which in turn drive compressors 32A, 32B and fan 30 via shafts 34A, 34B. A contra-rotating spool system can also be utilized, or a geared fan drive. Turboprop, turboshaft, and industrial gas turbine engine designs are also encompassed.

Fan 30 drives flow through bypass duct 38, generating thrust. Exhaust gases exit via nozzle 39, generating additional thrust. Exhaust nozzle 39 may have variable geometry, and an afterburner or thrust augmentor system may also be provided. Alternatively, a thrust reverser or other thrust directional system can be included.

One specific application of data acquisition and processing system 20 to a turbofan engine system 12 is graphically represented in FIG. 2. Fuel delivered to turbine engine system 12 is ignited in combustor 36, causing an increase in the gas pressure. The combustion gas expands through multi-stage turbine 33A, 33B. The first or upstream (high pressure) turbine stages 33A drive the high spool or N2 shaft 34A, connected to high pressure compressor stages 32A. The later or downstream (low pressure) turbine stages 33B drive the low spool or N1 shaft 34B, connected to low pressure compressor stages 32B. Low pressure compressor stages 32B can be rotationally coupled to a fan 30 at the front of the engine, or to a propeller system or output shaft configured to deliver torque or power to a rotary wing, generator, or other load.

Thrust is created as both the bypass stream (generated by the fan) and the exhaust stream (exiting the turbine) are expelled through exhaust nozzle system 39. The thrust is measured by the facility load cells. Corresponding operational parameters are measured by facility data acquisition and processing system 22, and recorded for subsequent analysis.

As shown in FIG. 2, fan speed sensor 24A is configured to measure the rotational speed of the low pressure or fan spool (N1), for example using an optical or magnetic tip sensor. The thrust is measured by the facility load cells, including, but not necessarily limited to, thrust sensors 24B utilizing a load cell or other sensor configuration to determine the pressure in and/or airflow through bypass duct 38, from which the thrust may be derived. Flow sensor 24C is configured to measure the fuel flow to combustor section 36, for example utilizing a volumetric or turbine flow meter.

These and other representative operational processing parameters are provided in Table 1, along with a list of related nomenclature. These particular parameters are merely representative, and additional operational parameters are also encompassed. Some additional parameters include operational temperatures, pressures, rotational speeds, and other measured quantities, and other additional parameters are derived quantities that can be determined from the measured quantities.

TABLE 1

NOMENCLATURE/PARAMETERS

| | |
|---|---|
| A | Filter Coefficient Vector |
| CRR | Covariance Matrix |
| CTR | Covariance Vector |
| DSP | Digital Signal Processing |
| EPR | Engine Pressure Ratio |
| E{x} | Expected Value (e.g., of parameter x) |
| Fc | Cutoff Frequency |
| Hz | Hertz (cycles per second) |
| N | Number of Data Points |
| N1 | Spool Speed (e.g., fan speed) |
| N2 | Spool Speed (e.g., core speed) |
| R | Residual (e.g., N1-N1$_{target}$) |
| RPM | Revolutions per Minute |
| S | Correction Derivative |
| SR | Sampling Rate |
| T | Measured Thrust (e.g., lbf) |
| V | Volume Flow Rate (e.g., turbine flow meter volume flow rate). |
| x$_n$ | n$^{th}$ Measurement Value (e.g., of parameter x) |
| Y | Filtered Output Vector |
| α | Block Update Coefficient |
| μ | Mean Value |
| θ | True Value (e.g., of corrected thrust) |
| $\hat{\theta}$ | Estimated value (e.g., of corrected thrust) |

Figure 3:
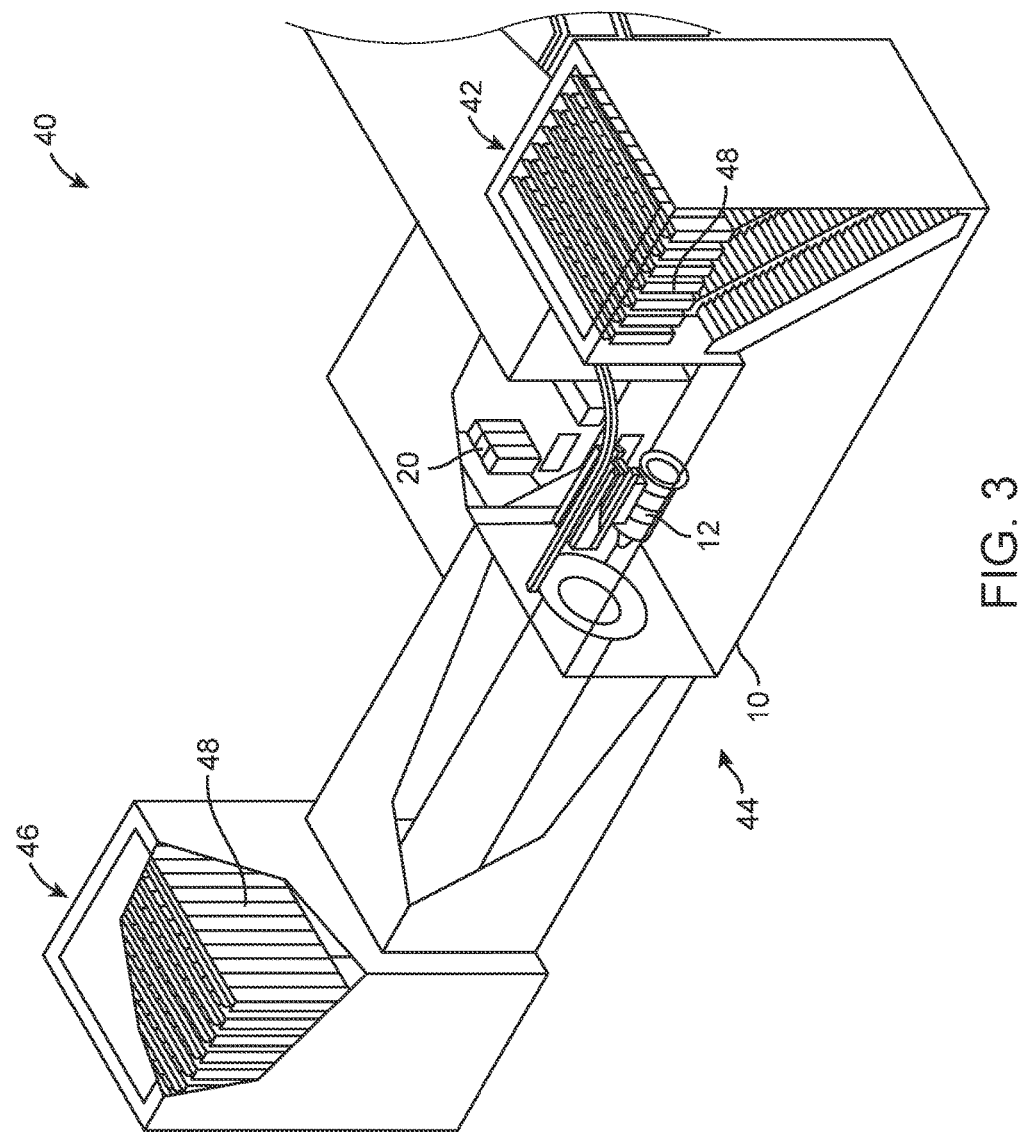
FIG. 3 is an isometric view of an aerodynamic testing facility incorporating the test cell and data processing system.

FIG. 3 is a schematic view of an aerodynamic test facility 40 incorporating test cell 10 and data acquisition and processing system 20. Typically, such facilities 40 may include an inlet and flow conditioning section 42, a central portion 44 with turbine engine system 12 mounted in test cell 10, and an outlet or exhaust section 46. Flow conditioning and silencer structures 48 may be provided in one or both of inlet and outlet sections 42 and 46.

Data processing system 20 may include a data acquisition system 22 with various sensors 24A, 24B, 24C, etc., configured for measuring or otherwise determining operational parameters of turbine engine system 12, and an operator interface or control system 26, for example as shown in FIG. 2 of the drawings (described above). Computer processors/microprocessors are also included for processing the resulting data, in order to generate an improved understanding of engine stability and corresponding operational parameter fluctuations, as described herein.

Bias and Precision in the Measurement Process

Experimental determination of physical parameters is subject to uncertainty in the measurement process. Separating the uncertainty into distinct components provides a basis for subsequent development.

Bias and precision are identified as principal components of the uncertainty, where bias refers to deterministic factors that show repeatable differences between the measured and true value. In most cases the true value of a given parameter is unknown, and must be estimated. A noteworthy example of bias for engine operation is the cell correction factors, which relate tests conducted in an indoor facility (test cell) to equivalent free space operation on an outdoor stand, and/or actual turbine operation (e.g., on an aircraft or in an industrial power production setting).

The formal definition of a stationary dataset is that all of the moments of the underlying statistical distribution are invariant with respect to a time shift. The synonymous term "shift invariance" has the same meaning when used in the context of digital data. In practice, it is common to assume that if the mean (μ) and variance (σ$^2$) do not change with time, then the higher moments are constant as well, and the system is assumed to be stationary. But this is not always the case.

Statistical precision can be determined for a stationary dataset by dividing the time series into individual segments. For each segment the mean and standard deviation can be determined. The standard deviation (σ) represents the expected error between a single measurement and the true value. This may, however, be a poor estimate of precision; nonetheless, one approach is to attempt to reduce the standard deviation of the mean by increasing the number of samples in the estimate.

The filtering process reduces the amplitude of the unsteadiness of the signal. The amount of reduction depends on the shape of the spectral distribution, and the fraction of energy above the cutoff frequency. The overall improvement in statistical precision is never as great as the amplitude reduction suggests, but it may be better than for the unfiltered process.

The dependence of the standard deviation of the mean on the number of samples suggests that statistical precision can be continuously reduced by simply increasing the number of samples in the estimate. But increased run time is often impractical from a test standpoint (e.g., due to labor and fuel costs), and maintaining stationary conditions may not be possible for an extended period.

Measurement precision is related to statistical precision, but includes other factors determined from independent but otherwise identical processes. Since conditions can never be exactly duplicated, measurement precision can be larger than the underlying statistical precision.

One requirement for a measurement system may be to establish that the statistical precision is much smaller than the overall measurement precision, giving greater assurance that a measured difference between otherwise identical test conditions is not caused by simple statistical variability. Suppose there is a difference of 0.1% between two tests. If the statistical precision is also 0.1%, then it cannot easily be determined with certainty whether there is any difference at all between the two tests. If, however, the statistical precision is 0.01%, then the measured difference has meaning. It may indicate a true difference in engine performance, for example, or it may be caused by differences associated with the measurement, such as a load cell tare shift. Eliminating or reducing the statistical variability thus allows easier diagnosis of the remaining issues.

Data Acquisition and Signal Processing

Prior to the development of digital signal processing (DSP), turbine engine data analysis was typically conducted by first averaging the parameter signals with analog methods, and then applying corrections and calculations to produce additional parameters. Transducers which convert physical values into gage or sensor data (readout) might need to be "filtered" to reduce variation in the output, and to allow the engineer or other operator to record the readings.

Pressure gages and manometers, for example, might employ a valve in the pneumatic line to reduce unsteadiness. Transducers producing voltage output could be averaged, e.g., using simple passive analog filters such as a first order resistor-capacitor (RC) circuit. These techniques reduce the variation in the sensor output, allowing the engineer to record an average value. When digital readouts became popular—but before their widespread use in data acquisition systems—the engineer could wait until the digits stabilized, and then mentally average the least significant digit(s) before recording the reading. In addition to the inherent uncertainty in each sensor device, these procedures also suffered from additional uncertainty resulting from errors in manual recording of the values.

Digital data acquisition improved efficiency, at least for the reason that additional support staff were no longer required to manually record parameter values. Accuracy was also increased, due to the elimination of the human element in both data collection and the subsequent calculation process. The digital process did introduce other issues that affect uncertainty, however, including questions of how long should the data be sampled, and at what rate, and whether an analog filter should be used in the circuit to provide averaging, or whether raw data should be collected and then averaged by digital means. The number of bits required in the digitization process is also an issue, as well as how often the system should be calibrated.

Once these and other issues are addressed, digital signal processing can provide significant improvements and increased understanding of complex engine processes, as compared to calculations based on measured or mean levels. In the analog world, for example, terms such as smoothing, averaging, and filtering were often used interchangeably, because the goal was to provide the best estimate of the steady state value(s)—whether or not a true steady state actually existed. In digital signal processing, these terms have more precise meanings, and they impart different interpretations onto the results.

Smoothing implies that there is a true steady state, and that the variation in the individual values is due to randomness in the measurement or noise in the electrical circuit of the associated sensor. It was typically assumed that these variations were uncorrelated, and had nothing in common with the underlying physical processes related to the measured parameter.

Averaging can be assumed to represent an estimate of a true steady state value. Averaging does not, however, necessarily make a distinction based on whether the underlying process is, or is not, inherently steady; instead, averaging is simply a mathematical process, by which an average result (e.g., a mean μ, or a weighted average) is determined from a number of individual measurements (e.g., $x_n$).

In digital signal processing, understanding the difference between smoothing, averaging, and filtering can be illustrated by the formulation:

$$y = a^T x. \qquad [1]$$

In this matrix equation, "y" is the output of the filter at the current time step, "a" is the N×1 vector of filter coefficients, and "x" is the N×1 vector of input data. The symbol "T" designates the transpose operator.

Centering around the filter coefficients, these describe a method to accumulate weighted values of measurements x, in order to produce output y. Assigning the filter coefficients is what separates averaging and smoothing from filtering.

Equation 1 is essentially a convolution between the data "x," and the filter function (or vector) "a." The filter represents a sliding window operating on the data, in order to produce output "y." To get the output at the next point requires sliding the window by one step, and repeating the process. This is done successively until all output values are determined.

The filter coefficients are chosen to achieve selected goals. In a deterministic filter, the coefficients are established in advance based on a general understanding of the signal character. A common procedure is to separate signals from noise by their frequency content. The filter coefficients can be described in the frequency domain, and an inverse Fourier Transform produces the time domain equivalent to be used directly in Equation 1.

Although any combination of high pass, low pass and/or band pass filters can be defined, one purpose here is to separate and retain the low frequency signal while discarding the high frequency noise. Recent development has focused on adaptive filters, which use the data itself to establish the filter coefficients and are continually updated as the process evolves.

As this process achieves stationarity (or stationary operation), the coefficients stabilize at fixed values. One formal definition of a stationary dataset is when all of the moments of the underlying statistical distribution are invariant to a time shift. The synonymous term "shift invariance" has the same meaning, when used in the context of digital data or digital signal processing.

Figure 4:
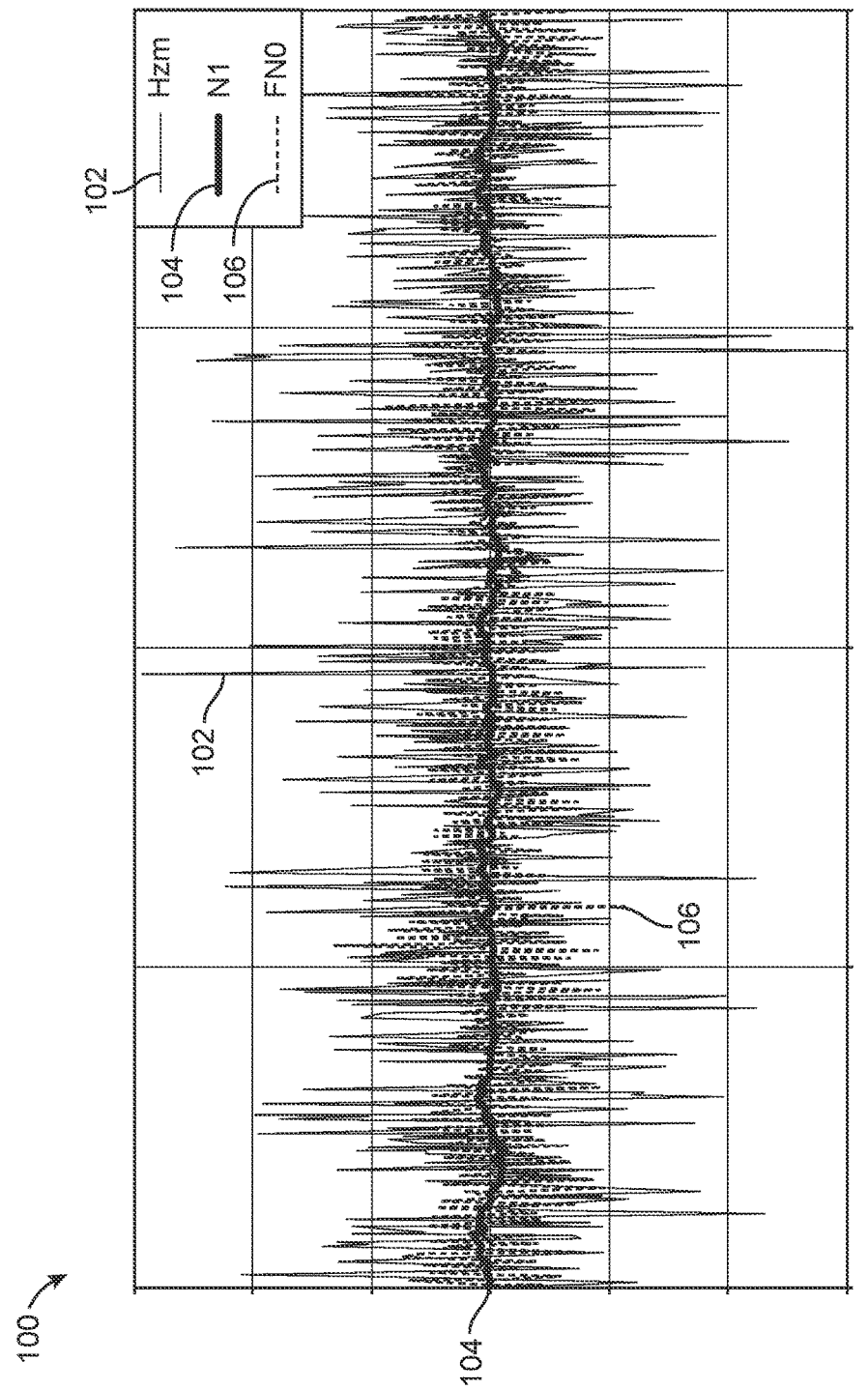
FIG. 4 is a plot of unfiltered time series measurements for selected performance parameters, generated by the data acquisition and processing system.

FIG. 4 is a representative time series output plot (100) for selected engine performance parameters, e.g., fuel flow 102, spool speed 104 and thrust 106. In this example, "Hzm" (fuel flow 102) is the output of a turbine flow meter which monitors the fuel flow rate as a frequency of the spinning turbine blades. Spool speed N1 (104) is the fan shaft speed (e.g., in RPM), and FN0 (thrust 106) is the output of a load cell measuring engine thrust, or a thrust value determined from one or more load cell outputs.

FIG. 4 shows a representative (e.g., 20 second) interval for the selected parameters, after the engine system has been allowed to stabilize for several minutes (e.g., two to five minutes, or at least one minute). The measured or determined parameter values are digitized at a selected sampling rate (e.g., at 40 samples per second), with anti-alias filtering at a selected frequency (e.g., set to 10 Hz). These particular parameters and time scales are merely representative, however, and these techniques can also be applied to any other performance parameters and time scales, as described herein, or as known in the art.

While the relative magnitude of each signal in a statistical sense can easily be determined, it is difficult to identify by direct inspection whether the fluctuations in the parameter values are correlated, or if they result from transducer noise, vibration, or other unsteadiness not related to the physical process underlying the parameter determination.

When engineering systems are converted from analog recording and manual processing to digital acquisition and processing, the averaging algorithm used in many analog systems can replaced by a digital equivalent, e.g.:

$$E\{X\} = \overline{X} = \frac{1}{N} \sum_{n=1}^{N} x_n. \qquad [2]$$

In this equation, the expected value or estimate of the true value "E{X}" is the mean ("$\overline{X}$" or "μ") of the N length dataset "$x_n$." Process equations coded into the algorithms automatically produce calculate parameters from these mean levels, replacing the labor intensive manual equivalent.

Equation 2 is equivalent to Equation 1 (averaging) when the filter coefficients are all equal; that is, with $a=(1/N, 1/N, 1/N, 1/N \ldots )^T$. The process weights each value by 1/N before the summation, rather than after, but it still produces the same answer.

Improved Signal Processing

Improved signal processing, as described here, is intended to use available computer resources more effectively, and to provide increased understanding of engine processes as compared to simple parameter averaging alone (e.g., as described by Equation 2). One exemplary procedure involves three processing steps, which can be applied in sequence to remove the "noisiness" of time series data (e.g., as shown in FIG. 3), and leave the filtered and processed signal describing the underlying engine process, which can be correlated between the measured parameters. Alternatively, the steps can be applied in a different order, one or more steps may be omitted, and additional steps can be included.

Step 1. A first step is to remove "noise" components mathematically—using a frequency cutoff filter—which is not associated with the engine process.

Step 2. A second step is to recognize that the engine control system produces variations in the dependent variables, or a selected subset of the process parameters, which may be correlated with a primary independent parameter—e.g., N1 shaft speed or the engine pressure ratio (EPR), or other selected parameter. As data are collected the selected subset of independent parameters are adjusted to a fixed or target value of the selected dependent or target parameter, for example using a Wiener filter to operate on each variable independently.

Step 3. A stochastic (e.g., Kalman) filter is used to remove uncorrelated noise, where a number of the parameters can be considered simultaneously using a state space model.

Other implementations may use a stochastic (Kalman) filter to monitor turbine engine data, but can suffer by operating directly on the measured data without removing the noise component using a frequency cutoff filter, or without recognizing the effect of the engine control system; that is, without also conducting one or both of Steps 1 and 2. This approach can retain one or both of the undesirable frequency components and unsteadiness associated with oscillations due to the engine control system feedback, because both have characteristics which can more closely resemble "signals" than uncorrelated "noise," which the Kalman (state-space) framework is designed to remove.

Addressing these undesirable components allows the Kalman filter to remove the uncorrelated noise and generate processed signal data that can reveal information about the "true" engine processes underlying the observed parameter values. The relevant steps are described individually in more detail below.

Figure 5:
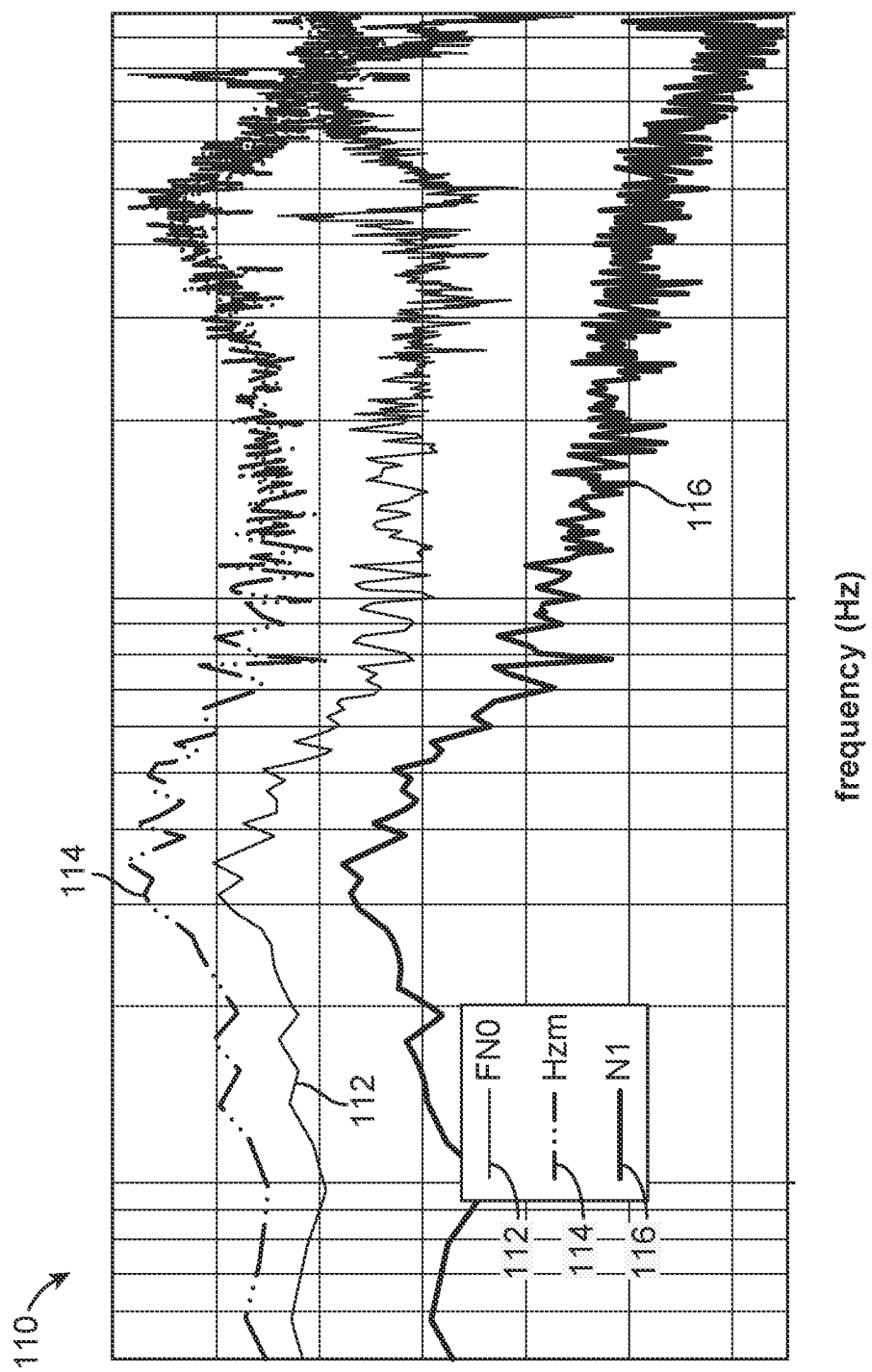
FIG. 5 is a plot of frequency spectra for the selected performance parameters.

FIG. 5 is a plot (110) of frequency spectra for the selected performance parameters of FIG. 4. In this example, frequency spectra are provided for parameters FN0 (engine thrust 112), Hzm (fuel flow 114), and spool speed 116 (e.g., low spool or fan speed N1). These particular parameters are merely representative, as described above, and similar techniques can be applied to any of the performance measurements or variables described herein, or as known in the art.

Step 1 of the analysis procedure starts by identifying the frequency content of the signals in FIG. 4, using a spectral analysis to produce FIG. 5. The frequency range extends to the alias limit, e.g., at 10 Hz, or at another value such as 1 Hz or less, or at 5 Hz, 15 Hz, 20 Hz, 30 Hz, 60 Hz, or 100 Hz or more. The time scale may be reduced below 20 seconds, e.g. to 10 seconds or below, or expanded above 20 seconds, e.g., to 30 seconds, 60 seconds, or more. The data sampling rate also varies, for example from about 10, 20 or 30 samples per second or less, to 50, 60, 80 or 100 samples per second or more.

Examination of the spectra in FIG. 5 identifies a number of peaks that can be associated with different features of the selected parameter measurements. While it may be difficult to imagine that frequencies above ~1 Hz are associated with engine unsteadiness, their existence nonetheless provides information on system operation. For example, the peak at ~5 Hz in the fuel flow line may correspond with a hydroacoustic event, similar to a water hammer in a plumbing system. Although the amplitude of this feature can be significant, there is no corresponding peak in the N1 signal, implying that the 5 Hz fuel flow signal is not necessarily correlated with engine variations, or variations in other engine performance parameters.

The two relatively narrow peaks at 4.5 Hz and 7.8 Hz in the thrust signature may be due to mechanical vibration of the thrust frame itself, also not part of the physical engine processes of interest. Thus, neither of these features may be considered significant regarding engine operation. The broad "hump" at ~0.4 Hz exists in all three signals, and may be associated with a physical engine process. As the engine control system attempts to maintain constant N1, for example, the fuel flow is constantly being adjusted. This in turn can cause corresponding fluctuations in spool speed N1, in thrust level FN0, or in other performance parameters.

Understanding the relationships (or correlations) between and among these different variables is related to Step 2. In Step 2, a filter (e.g., vector "a") is defined with a 1 Hz cutoff frequency and used to produce a filtered sequence using Equation 1. The result for the dataset in FIGS. 3 and 4 is shown in FIG. 5. The unsteady amplitude of each signal is reduced and the relationship between each of the signals is clear. The peaks and valleys in the fuel flow signal are nominally reflected in both the N1 and FN0 signals. Step 2 exploits this relationship using the concept of adaptive filtering.

Figure 6:
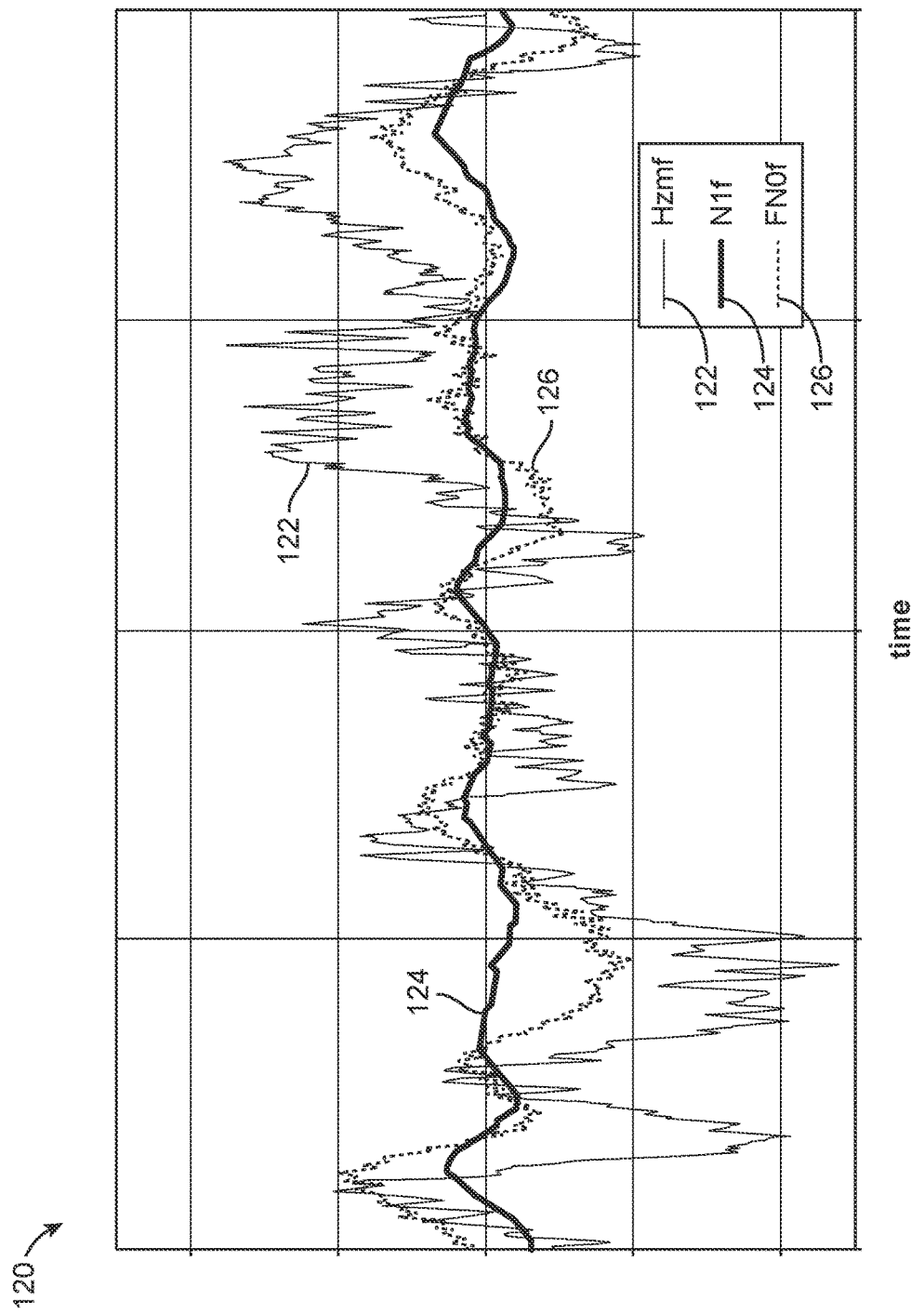
FIG. 6 is a filtered time series plot for the selected performance parameters.

FIG. 6 is a filtered time series plot (120) for the selected performance parameters. In this example, time series plots are provided for parameters FN0 (engine thrust 122), Hzm (fuel flow 124), and spool speed, e.g., low spool or fan speed N1 (126). These particular parameters are merely representative, and similar techniques can be applied to any of the performance measurements or variables described herein, or as known in the art.

Examination of the locations of the peaks and valleys in FIG. 6 suggests behavior somewhat inconsistent with what might be expected from other techniques. An incremental change in fuel flow, for example, may precede an incremental change in spool speed N1, which in turn may precede a corresponding thrust impulse. Visual inspection, however, appears to show that spool speed N1 lags thrust FN0 by a small amount, contrary to the known or expected physical process.

Such anomalies may be explained by previously unknown timing factors in or related to the measurement process. For example, the fuel flow meter may be located a distance upstream of the engine, suggesting a time lag between its measurement and the actual injection of fuel into the combustor. In addition, there may be a question as to whether the output of the (e.g., turbine) flow meter in fact represents the instantaneous fuel flow, or there could be an inertial lag inherent in the device. Nominally, the fuel is also incompressible, but an advanced data process should also consider the compliance of the fuel line, which can cause fluctuations in the flow parameter to travel at a finite speed within the engine system.

Another question is how long it takes for a given fuel increment to reach the engine or combustor. There is also time required to convert the fuel flow into heat energy, and for the subsequent increase in a first (e.g., high pressure or core) spool speed N2, followed (e.g., shortly thereafter) by a corresponding increase in a second (e.g., low, intermediate pressure or fan) spool speed N1. Since determination of spool speeds N1 and N2 may be performed by the engine control system itself (i.e., rather than using a separate sensor system), the time lag associated with the spool speed reporting process may also be unknown.

Ultimately these factors may lead to incremental changes in the thrust measured by the test cell load frame, which also has its own inertial characteristics, and which can also affect the load cell (or other sensor) outputs, relative to the actual thrust increment or other performance parameter. One point of this discussion is that these factors and related questions may not necessarily matter from the standpoint of statistical signal processing, but the timing of the reporting processes between each of the measurements should remain consistent. The statistical relationships will thus be retained, and this fact can be exploited in subsequent processing.

Step 2 centers on the stationary time series data shown in FIG. 6. This procedure adjusts the dependent parameters to (or with respect to) the target value of a corresponding independent parameter. In this particular example the development can be presented using the thrust level (FN0) as an independent parameter and N1 spool speed (or other spool speed) as the dependent parameter, but the identification and dependent and independent parameters may be considered somewhat arbitrary and these procedures can also be applied to any of the other performance parameters requiring adjustment, as described above.

The process model relating these measurement to the corresponding adjusted values may be given by:

$$\theta = T - a^T R. \qquad [3]$$

In this expression, "T" is the N×1 vector of measured thrust values and "R" is the N×1 vector identifying the difference between the measured and target values for spool speed N1. The filter coefficient "a" is also an N×1 vector, similar to that described in Equation 1.

Equation 3 accounts for the impulse response function, as defined between spool speed N1 and measured thrust values T, and produces a new thrust value "θ" that corresponds to a value for spool speed N1 and/or EPR with effects of the engine control system removed. A theoretical impulse in spool speed N1 (approaching or approximated by an infinitely high, infinitely narrow generalized delta function "δ") can be converted into a finite height/finite width response in the thrust (e.g., a short time later).

Vector parameters can be indexed to start at the current time, and look backward to preceding values. Thus, the "nth" value of a given vector variable may correspond to a previous time $t=(n-1)\Delta t$, as defined before the present time $t=0$.

If a given process is truly steady state, then the filter coefficient vector may be represented as $a=(S,0,0,0,0, 0 \ldots )^T$, resulting a conventional steady state correction, $\theta=T-SR$, where $S=\dot{T}/\dot{R}$ is derived from steady state measurements. The steady state deviation between a measured and target spool speed, for example, can be adjusted by the derivative and subtracted from the steady state thrust to yield the adjusted thrust.

For transient conditions, the coefficient vector takes on non-zero values to automatically account for the process lag between, e.g., spool speed N1 and thrust FN0. This coefficient vector may initially be unknown, but can be found using a least mean square (LMS) procedure or similar minimization technique, in order to determine the filter coefficients iteratively.

The least mean square procedure starts by assigning arbitrary values to the vector "a" and forming the instantaneous square error:

$$e^2 = [(T-\bar{T}) + a^T (R-\bar{R})]^2. \qquad [4]$$

At each time step, a new set of filter coefficients can be determined, e.g., using a gradient descent method to reduce the square error $e^2$ by a small amount:

$$a_{new} = a - \lambda \frac{\partial(e^2)}{\partial a}. \qquad [5]$$

Combining equations leads to the LMS filter update:

$$a_{new} = a + 2\lambda[(T-\bar{T}) - Sa^T(R-\bar{R})](R-\bar{R}), \qquad [6]$$

which can converge to Wiener filter coefficients after sufficient iterations.

The learning rate "λ" determines the speed of convergence. A large value tends to converge rapidly, but is susceptible to instability if the new filter values overshoot the intended target value. A small value tends to minimize the possible instability, but may take too long to converge. It is common to choose the learning rate "λ" as a fixed fraction "γ" of the square error, $$\lambda = \frac{\gamma}{(R-\bar{R})^T(R-\bar{R})}. \qquad [7]$$

Once each of the independent parameters have been adjusted (e.g., using Equation 3), a goal of Step 3 is to implement a stochastic filtering algorithm such as a Kalman filter to remove remaining uncorrelated noise, e.g., from all parameters simultaneously. In application, this may leave only the correlated engine process variations. The process variations y(k) (collectively known as the system state) are determined using a linear state space model:

$$y(k) = Ay(k-1) + w(k), \qquad [8A]$$

and $$z(k) = Hy(k) + v(k). \qquad [8B]$$

Equation 8A above defines a process which updates state y(k) of the system using a transition matrix A and process noise function w(k). Equation 8B relates state y(k), which represents the signal portion of each measurement, to measurement z(k), which may be "contaminated" by measurement noise v(k).

Because knowledge of the process and measurement noise is available through the statistics of each parameter, the functional form of the equations can be recast using the expected values of each noise process. Following this procedure recursively estimates the new system state y(k) using only the current data z(k) and the previous state estimate y(k-1):

$$y(k) = Ay(k-1) + K(z(k) - HAy(k-1)), \qquad [9]$$

with $$K = [AP(k)A^T + Q]H^T[H[AP(k)A^T + Q]H^T + R]^{-1}. \qquad [10]$$

This may be interpreted as a stochastic or Kalman filter, where K is the filter coefficient vector (or Kalman gain), which is updated at each step. The symbols A and H represent (e.g., known or predetermined) transition matrices, Q and R represent (e.g., known or predetermined) process and measurement noise covariances, and P is the error covariance matrix updated from the prior state:

$$P(k)=(I-KH)[AP(k-1)A^T+Q].  \quad [11]$$

In the general case, a Kalman procedure can include both measured and non-measured parameters, assuming a suitable model is available to connect the system. The present implementation uses a suitable model, and estimates the new state consisting of measured variables and their derivative (slope).

This framework can be applied to any number of measured variables or performance parameters, for example as associated with turbine engine system operation. One example includes three measurements (fuel flow, spool speed N1, and thrust), with a goal of separating the signal buried in each noisy measurement. The Kalman estimator starts from the definition of measurement and state, and the measurement vector includes the three variables of interest:

$$z=[Hzm_z, N1_z, FN0_z]^T. \quad [12]$$

The state vector consists of the signal associated with each measurement and its local derivative:

$$y=[Hzm_y, dH_y, N1_y, dN_y, FN0_y, dFN0_y]^T. \quad [13]$$

With these definitions and an arbitrary unit time step, the required matrices become:

$$H = \begin{pmatrix} 1 & 0 & 0 & 0 & 0 & 0 \\ 0 & 0 & 1 & 0 & 0 & 0 \\ 0 & 0 & 0 & 0 & 1 & 0 \end{pmatrix}$$

and $$A = \begin{pmatrix} 1 & 1 & 0 & 0 & 0 & 0 \\ 0 & 1 & 0 & 0 & 0 & 0 \\ 0 & 0 & 1 & 1 & 0 & 0 \\ 0 & 0 & 0 & 1 & 0 & 0 \\ 0 & 0 & 0 & 0 & 1 & 1 \\ 0 & 0 & 0 & 0 & 0 & 1 \end{pmatrix},$$

with $$R = \begin{pmatrix} \sigma_H^2 & 0 & 0 \\ 0 & \sigma_N^2 & 0 \\ 0 & 0 & \sigma_F^2 \end{pmatrix}$$

and $$Q = \begin{pmatrix} 1 & 1 & 0 & 0 & 0 & 0 \\ 1 & 1 & 0 & 0 & 0 & 0 \\ 0 & 0 & 1 & 1 & 0 & 0 \\ 0 & 0 & 1 & 1 & 0 & 0 \\ 0 & 0 & 0 & 0 & 1 & 1 \\ 0 & 0 & 0 & 0 & 1 & 1 \end{pmatrix} * \sigma_w^2.$$

The measurement variances are determined as expected values from prior data and the prior estimated states:

$$\sigma^2 = E\{(\hat{y}_{2i+1}(k) - z_i(k))^2\}, \text{ for } i=1 \text{ to } 3. \quad [14]$$

The indices represent the vector elements in Equations 12 and 13. The process noise a is considered a universal design variable, applied to the block Toeplitz (or diagonal-constant) matrix.

Figure 7:
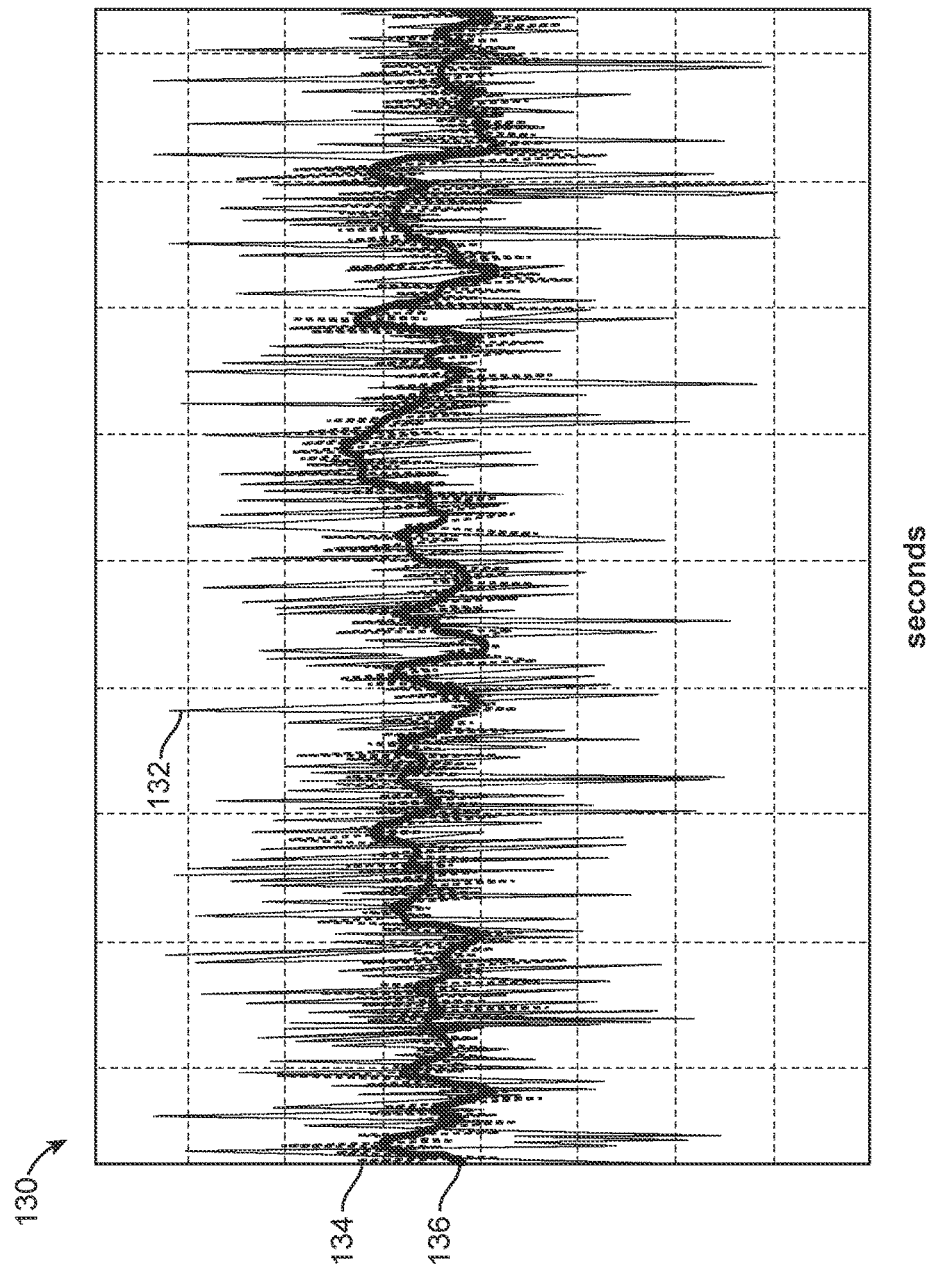
FIG. 7 is a plot illustrating a three-step data processing procedure for one of the selected performance parameters.

FIG. 7 is a plot (130) illustrating a three-step data processing procedure for one of the selected performance parameters, for example engine thrust FN0. In this example, the complete three-step process is applied to the thrust data, after the turbine engine system has stabilized for several minutes. Plot 130 of FIG. 7 (and any of the other plots or output described here) can be provided on a graphical user interface or other computer display incorporated into an operator interface or turbine control system 26, for example as shown in FIG. 2 of the drawings (described above).

The bold exterior band (curve 132) is the signal resulting after Step 1 is applied to remove high frequencies (e.g., above 1 Hz), this is consistent with the FN0 signal in FIG. 6. The intermediate band (curve 134) is the signal resulting after Step 2 is applied to remove effects of the engine control system oscillations. The black line (curve 136) is the signal resulting after Step 3 is applied to remove remaining uncorrelated noise. This analysis sequence reveals the true engine process.

Applications

Figure 8:
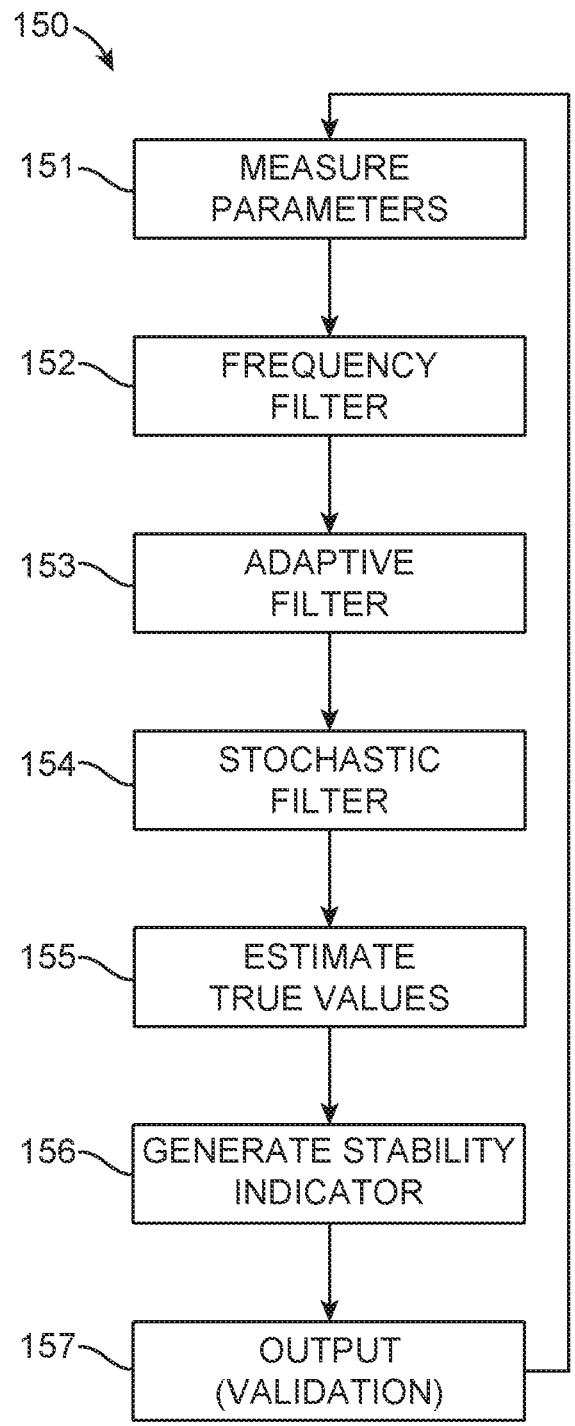
FIG. 8 is a block diagram illustrating a method for implementing the data processing procedure.

FIG. 8 is a block diagram illustrating method 150 for implementing the data processing procedures described herein. As shown in FIG. 8, method 150 incorporates one or more steps including, but not limited to: measuring values of performance parameters (step 151) for a turbine engine system, removing frequency components (step 152) from the measured values, applying an adaptive filter (step 153) to adjust the measured values to a target value of the independent parameters, applying a stochastic filter (step 154) to reduce noise in each of the measured values, and estimating true values (step 155) of the dependent parameters.

For selected performance parameters the true values may often be only quasi-stable; that is, they may demonstrate a level of unsteadiness around a base value, where the unsteadiness provides useful information about operation of the turbine system. Thus, a stability indicator (step 156) can be generated for the turbine system, based on or describing variation in the "unsteady" true values of the dependent parameters. The stability indicator can then be output to a graphical display in order to validate (or invalidate) a particular data set, in response to the indicator indicating stable or unstable engine performance over a given data set or data acquisition time window, and/or utilized to control data taking and turbine system operation using an engine control module (step 157).

Depending upon application these steps may be performed in different orders or combinations, with or without additional data processing and control steps. In a blowdown nozzle testing facility, for example, such an algorithm can be used to evaluate the unsteady true values of the nozzle pressure ratio, gas temperature, measured thrust, discharge coefficient, thrust coefficient, and other parameters. This information can then be graphically displayed to users such as test tunnel operators, who use the observed slope and jitter of the presented curves to determine the stability of the apparatus, and thereby the validity of the data collected at that data point. Alternatively, a computer algorithm or control module operating on the stability indicator or stability processor can be used to determine whether the parameters are sufficiently steady for the data to be valid (or invalid). The computer algorithm can utilize any of the data processing techniques described herein to determine stability, for a data set collected over a particular time window.

In a turbine engine testing application, such an algorithm can be used to evaluate the unsteady true values of multiple engine parameters (e.g., as listed below), believed to collectively define engine stability. A dedicated engine stability assessment computer can be used to apply the algorithm to data collected by, and communicated from the test facility's data acquisition system. The engine stability assessment computer then applies stability criteria (e.g., as defined by engine performance engineers and test operators), and generates a go-no go indication of the stability each of the parameters listed. When all of the selected parameters are defined as "go" for a prescribed period or data collection time (typically 30 seconds), the engine stability assessment computer can advise the test cell DAS system that the data collected and saved for the previous collection window (e.g., 30 seconds), is a stabile (e.g., stationary or stable) data set (or power point) for the engine being tested, validating the test data. Alternatively the test data may be validated or invalidated based on the whether the stability indicator characterizes stable or unstable operation of the turbine engine over the given data set and data acquisition time window, respectively.

Relevant parameters to which these techniques are applied include, but are not limited to:
  Rotor speeds (e.g., N1, N2, N3, etc., in a multi-spool turbine engine)
  Fan Discharge Temperature, Fan Discharge Pressure (e.g., for the fan stage of a turbofan engine)
  Compressor Discharge Temperature, Compressor Discharge Pressure (e.g., for a high, low or intermediate pressure compressor section)
  Turbine Temperature, Turbine Discharge Pressure (e.g., for a high, low or intermediate pressure turbine section)
  Engine Oil Temperature, Engine Oil Pressure; Oil Scavenge Temperature
  Vibrations (e.g., engine-induced vibrations measured on an engine housing or mount structure)
  Variable Geometry Positions (e.g., for a variable geometry nozzle or variable geometry guide vane system)
  Case Cooling Positions (e.g., as related to cooling fluid flow for the engine case of a gas turbine engine)
  Inlet Air Temperature (e.g., ambient value or in a test cell chamber)
  Barometric Pressure and Humidity (e.g., ambient value or in a test cell chamber)
  Cell Depression (e.g., difference between ambient barometric pressure and static pressure in the test cell chamber, referenced to the engine inlet)
  Thrust (alternately, torque or power output); Engine Pressure Ratio (EPR)
  Fuel flow (e.g., to the combustor section of a gas turbine engine)

Any combination of these (and other) performance parameters can be used to generate unsteady true values for analysis, and validate a given data set. When one or more parameters are designated "no-go" for a prescribed period or data collection time, the test data are not necessarily valid, and additional test data may be required.

These techniques provide an operational parameter assessment tool for determining engine stability or instability. The algorithm can be run on a nominally stable turbine engine system, using the "unsteady" true parameter value estimates to detect unexpected anomalies—for example, due to internal engine control systems or other effects. The applications include both stability analysis, for operation of a given turbine system, and diagnostics tool for detecting such effects. The output can be used to identify or designate (validate) particular data sets, based on the engine indicator, or to control engine operations, for example to advance testing to an additional thrust point or other target parameter value, after validating the data for the prior target value.

These techniques can be applied to the full complement of engine performance defining parameters, in order to better define engine stability and get better insight into the engine's internal control system behavior. Where the engine stability is defined parametrically (e.g., by computer or operator using a graphical display), substantial time and fuel costs can be saved by validating data as soon as the turbine engine system has had stable operations for a known predetermined period, and then proceeding to another engine power point or thrust level.

This technique also provides a level of confidence that the data set acquired during a particular period is indeed valid, based on the stability indicator. This is a substantial improvement over other techniques, where the engine is simply run for a period of time between power point settings, and it is assumed that the data are valid after that time has expired.

These techniques can also be used to identify unexpected turbine system behaviors and operational anomalies. While there is a definite relationship between fuel flow to the combustor and engine thrust, for example, even when fuel flow is controlled in a substantially smooth or continuous fashion (e.g., over a period of minutes), some turbine parameters may "jump" or show relatively sharp changes over small time scales (e.g., on the order of seconds).

Based on this, the instability time scale may be much less than the typical "predetermined" time scale of several minutes required for stable operations, or the data collection window of several tens of seconds (e.g., between 0 and 10, 20, 30, 40, 50 or 60 seconds, or more). The traditional technique of averaging data over this time scale could mask the fact that the system may actually have been operating in two distinct modes or operating states over the data collection window. Use of a stability indicator can thus not only reduce the wait time between data collections (e.g., at different power or thrust point settings), but also provide a greater level of confidence that any particular data set actually represents stable running.

The stability indicator output takes on a number of different forms, from a filtered, processed signal "trace" (e.g., FIG. 7 or 8), to a binary "go/no-go" indicator or a numerical indicator of relative stability. Testing can also be performed on both complete turbine engines and turbine engine subsystems. The number of parameters used in the analysis also varies, from a few "critical" engine parameters related to thrust, pressure ratio, spool speeds, etc., or up to fifty or more individual parameters, including, but not limited to, each of those described herein.

EXAMPLES

In various examples and embodiments, a method for evaluating turbine engine system stability includes determining values of performance parameters for a turbine engine system. The performance parameters can include selected independent and dependent parameters, forming a data set generated over a selected data acquisition period.

The data set is stored in computer memory, with a computer processor in data communication with the computer memory. The computer processor executes customized software modules configured for removing high frequency components from the determined values of the performance parameters and applying an adaptive filter to adjust the determined values according to a target value of a selected independent parameter, where the adaptive filter is corrected based on prior determined values of the performance parameters. The processor also applies a stochastic filter to reduce noise in each of the determined values, estimating true values of the dependent parameters based on remaining variation in the determined values.

A stability indicator is generated for the turbine engine system, based on or characterizing variation in the estimated true values of the dependent parameters. The stability indicator is displayed on an operator interface, indicating whether the turbine engine system operated in a substantially stable mode over the selected data acquisition period.

In any of the examples and embodiments herein, removing the high frequency components, applying the adaptive filter, applying the stochastic filter, estimating the true values, and generating the stability indicator may be performed in respective time order. In addition, displaying the stability indicator can include plotting the estimated true values of selected independent and dependent parameters on the operator interface, over the data set, and/or over the selected data acquisition period.

In any of the examples and embodiments herein, the processor can validate the data set for the target value of the selected independent parameter, based on or in response to the stability indicator indicating stable operation of the turbine engine system over the data set or selected data acquisition period. The processor can also collect a second data set of the performance parameters, where the stochastic filter is applied to adjust the determined values of the dependent parameters according to a second target value of the selected independent parameter. The second data set can then be validated for the second target value of the selected independent parameter, based on or in response to the stability indicator indicating stable operation of the turbine engine system over the second data set.

Alternatively, the computer processor may invalidate the data set in response to the stability indicator indicating unstable operation of the turbine engine system over the data set, or over the selected data acquisition period. For example, the stability indicator may describe a change between different operational states of the turbine engine system within the selected data acquisition period, where the different operational states are characterized by different estimated true values of a selected dependent parameter. The stability indicator may also describe a slope in the estimated true values of a selected dependent parameter, where the slope is characterized over the data set or selected data acquisition period, or the stability indicator may describe a jitter characterized by deviations in the estimated true values of a selected dependent parameter, over the data set or selected data acquisition period.

In any of the examples and embodiments herein, the true values can be estimated based on a difference between the determined values of the selected independent parameter and the target value. In addition, the adaptive filter can be updated based on the difference.

In any of the examples and embodiments herein, the estimated true values may describe thrust generated by the turbine engine system, and the selected independent parameter may describe a spool speed of the turbine engine system. The estimated true values can also describe power or torque generated by the turbine engine system, and the selected independent parameter can describe a shaft speed of the turbine engine system.

In any of the examples and embodiments herein, applying the stochastic filter can include recursively estimating a signal portion of the determined values in which the noise is reduced, using the determined values and previous estimates of the signal portion. For example, the stochastic filter can be recursively applied to the determined values.

In system and apparatus embodiments, a plurality of sensors are configured to determine values of performance parameters for a turbine engine, with computer memory configured for storing the data set, a processor in communication with the computer memory, and a graphical user interface in communication with the computer processor. The performance parameters form a data set generated over a selected data acquisition period. The computer processor is configured (e.g., by executing custom software code) to remove high frequency components from the determined values of the performance parameters, and apply an adaptive filter to adjust the determined values of a selected subset of the performance parameters based on a target value of a selected target parameter, where the adaptive filter is corrected based on prior determined values of the performance parameters.

A stochastic filter is applied to reduce noise in each of the determined values, and true values of the selected subset of performance parameters are estimated based on remaining variation in the determined values. The graphical user interface is configured to display a stability indicator for the turbine engine, indicating whether the turbine engine was operating in a stable or unstable mode over the selected data acquisition period, based on variation in the estimated true values of the dependent parameters.

In any of the examples and embodiments herein, the computer processor can be configured to perform removing the high frequency components, applying the adaptive filter, applying the stochastic filter, estimating the true values and generating the stability indicator in respective time order. The computer processor can further be configured to validate the data set for the target value, in response to the stability indicator indicating stable operation of the turbine engine over the selected data acquisition period, and then select a second target value of the target parameter. The adaptive filter can be applied to adjust the determined values of the selected subset of performance parameters according to the second target value of the target parameter, and the processor can validate the data set for the second target value in response to the stability indicator indicating stable operation of the turbine engine system over the selected data acquisition period, at the second target value.

In any of the examples and embodiments herein, the computer processor can be configured to estimate the true values based on a difference between the determined values of the target parameter and the target value, and to update the adaptive filter based on the difference. The computer processor can also be configured to recursively apply the stochastic filter to the determined values of the performance parameters in order to estimate a signal portion in which the noise is reduced, using the determined values and previous estimates of the signal portion.

In any of the examples and embodiments herein, the selected subset of performance parameters can describe a shaft speed or spool speed of a gas turbine engine. For example, the turbine engine may comprise a turbofan engine and the target parameter may describes thrust. Alternatively, the turbine engine may comprise a turboshaft or turboprop engine, or an industrial gas turbine, and the target parameter may describe torque or power output.

Suitable program code can be stored on a non-transitory computer readable data storage medium, with the program code being executable by a computer processor to perform a method of turbine engine stability determination. The method includes steps of determining values of performance parameters of a turbine engine, where the performance parameters form a data set generated over a selected data acquisition period or time window, and storing the data set in computer memory.

In these embodiments the computer processor is in communication with the computer memory, and executes the program code for removing high frequency components from the determined values of the performance parameters, and applying an adaptive filter to adjust the determined values of a selected subset of the performance parameters according to a target value of a target parameter selected from the performance values. The adaptive filter is corrected based on prior determined values of the performance parameters. The processor also executes the program code for applying a stochastic filter to reduce noise in each of the determined values, and estimating true values of the dependent parameters, based on a remaining variation in the determined values. A stability indicator for the turbine engine is displayed on a graphical user interface in communication with the computer processor, indicating whether the turbine engine operated stably over the data set by characterizing variation in the estimated true values of the dependent parameters over the selected data acquisition period.

In any of these examples and embodiments, the computer processor can validate the data set for the target value, in response to the stability indicator indicating stable operation of the turbine engine over the selected data acquisition period. Alternatively, the computer processor may invalidate the data set, in response to the stability indicator indicating unstable operation of the turbine engine over the selected data acquisition period, (e.g., operation in more than one distinct stable mode, or with instability characterized by a slope or jitter in the estimated true values of the performance parameters).

In any of these examples and embodiments, the stochastic filter can be recursively applied to the determined values of the performance parameters in order to estimate a signal portion in which the noise is reduced, using the determined values and previous estimates of the signal portion. The selected subset of performance parameters can describe a shaft speed or spool speed of the turbine engine, and the target parameter may describe thrust, torque or power output.

While this description is made with reference to exemplary embodiments, it will be understood by those skilled in the art that changes can be made and equivalents can be substituted without departing from the spirit and scope of the invention. Modifications can also be made to adapt the teachings of the invention to other applications and situations, and to use other materials, without departing from the essential scope thereof. The invention is thus not limited to the particular examples that are disclosed, but encompasses all embodiments falling within the scope of the appended claims.

The invention claimed is:

1. A method for turbine engine system stability, the method comprising:
   operating a data acquisition computer processor with one or more sensors configured to measure performance parameters for operation of the turbine engine system;
   determining values of the performance parameters for the turbine engine system, the performance parameters including independent parameters and dependent parameters forming a data set generated over a selected data acquisition period;
   storing the data set in computer memory;
   with the computer processor in communication with the computer memory:
      removing high frequency components from the determined values of the performance parameters;
      applying an adaptive filter to adjust the determined values of the dependent parameters according to a target value of a selected independent parameter, wherein the adaptive filter is corrected based on prior determined values of the performance parameters;
      applying a stochastic filter to reduce noise in each of the determined values;
      estimating true values of the dependent parameters, based on a remaining variation in the determined values; and
      generating a stability indicator for the turbine engine system, based on variation in the estimated true values of the dependent parameters;
   displaying the stability indicator on an operator interface in communication with the computer processor, and respectively:
      validating the data set for the target value of the selected independent parameter in response to the stability indicator indicating stable operation of the turbine engine system over the selected data acquisition period, wherein a second target value of the selected independent parameter is selected and the stochastic filter is applied to adjust the determined values of the dependent parameters according to the second target value; or
      invalidating the data set for the target value in response to the stability indicator indicating unstable operation of the turbine engine system over the selected data acquisition period, wherein additional data are required to validate the data set for the target value.

2. The method of claim 1, wherein removing the high frequency components, applying the adaptive filter, applying the stochastic filter, estimating the true values and generating the stability indicator are performed in respective time order.

3. The method of claim 2, wherein displaying the stability indicator comprises plotting the estimated true values of at least one selected independent or dependent parameter on the operator interface, over the selected data acquisition period.

4. The method of claim 1, further comprising the computer processor advancing to the second target value based on the stability indicator, after validating the data set for the target value, and:
   collecting a second data set of the performance parameters, wherein the stochastic filter is applied to adjust the determined values of the dependent parameters according to the second target value of the selected independent parameter; and
   validating the second data set for the second target value of the selected independent parameter, in response to the stability indicator indicating stable operation of the turbine engine system over the second data set.

5. The method of claim 1, wherein the stability indicator describes a change between different operational states of the turbine engine system within the selected data acquisition period, the different operational states characterized by different estimated true values of a selected dependent parameter.

6. The method of claim 1, wherein the stability indicator describes a slope in the estimated true values of a selected dependent parameter, the slope characterized over the selected data acquisition period.

7. The method of claim 1, wherein the stability indicator describes a jitter characterized by deviations in the estimated true values of a selected dependent parameter, over the selected data acquisition period.

8. The method of claim 1, wherein the true values are estimated based on a difference between the determined values of the selected independent parameter and the target value, and further comprising updating the adaptive filter based on the difference.

9. The method of claim 8, wherein the estimated true values describe thrust generated by the turbine engine system and the selected independent parameter describes a spool speed of the turbine engine system.

10. The method of claim 8, wherein the estimated true values describe power or torque generated by the turbine engine system and the selected independent parameter describes a shaft speed of the turbine engine system.

11. The method of claim 1, wherein applying a stochastic filter comprises recursively estimating a signal portion of the determined values in which the noise is reduced, using the determined values and previous estimates of the signal portion.

12. The method of claim 11, wherein recursively estimating the signal portion comprises recursively applying the stochastic filter to the determined values of the performance parameters.

13. A non-transitory computer readable data storage medium having program code stored thereon, the program code executable by a data acquisition computer processor to perform a method comprising:
   operating the data acquisition computer processor with one or more sensors configured to measure performance parameters of a turbine engine system;
   determining values of the performance parameters in operation of the turbine engine system, the performance parameters forming a data set generated over a selected data acquisition period;
   storing the data set in computer memory, and, with the computer processor in communication with the computer memory:
      removing high frequency components from the determined values of the performance parameters;
      applying an adaptive filter to adjust the determined values of a selected subset of the performance parameters according to a target value of a target parameter selected from the performance, wherein the adaptive filter is corrected based on prior determined values of the performance parameters;
      applying a stochastic filter to reduce noise in each of the determined values;
      estimating true values of the subset of performance parameters, based on a remaining variation in the determined values; and
      displaying a stability indicator for the turbine engine on a graphical user interface in communication with the computer processor, the stability indicator indicating whether the turbine engine operated stably over the data set by characterizing variation in the estimated true values of the selected subset of performance parameters over the selected data acquisition period; and
   validating the data set for the target value of the target parameter in response to the stability indicator indicating stable operation of the turbine engine system over the selected data acquisition period, wherein the stochastic filter is applied to adjust the determined values of the dependent parameters according to a second target value of the selected independent parameter; or
   invalidating the data set for the target value of the target parameter in response to the stability indicator indicating stable operation of the turbine engine system over the selected data acquisition period, wherein additional data are required to validate the data set for the target value.

14. The data storage medium of claim 13, wherein applying a stochastic filter comprises recursively applying the stochastic filter to the determined values of the performance parameters to estimate a signal portion in which the noise is reduced, using the determined values and previous estimates of the signal portion.

15. The data storage medium of claim 13, wherein the selected subset of performance parameters describes a shaft speed or spool speed of the turbine engine and the target parameter describes thrust, torque or power output.

16. The data storage medium of claim 13, the method further comprising the computer processor advancing to the second target value based on the stability indicator, after validating the first data set for the first target value.

17. The data storage medium of claim 16, the method further comprising reducing a predetermined time scale or wait time between collecting the first and second data sets, using the stability indicator.

* * * * *